United States Patent
Olm et al.

(10) Patent No.: US 8,991,740 B2
(45) Date of Patent: Mar. 31, 2015

(54) VEHICLE WITH AERIAL AND GROUND MOBILITY

(71) Applicant: Draganfly Innovations Inc., Saskatoon (CA)

(72) Inventors: Orville Olm, Saskatoon (CA); Greg Wood, Saskatoon (CA); Zenon Dragan, Saskatoon (CA)

(73) Assignee: Draganfly Innovations Inc., Saskatchewan (CA)

( * ) Notice: Subject to any disclaimer, the term of this patent is extended or adjusted under 35 U.S.C. 154(b) by 0 days.

(21) Appl. No.: 13/846,074

(22) Filed: Mar. 18, 2013

(65) Prior Publication Data

US 2014/0061362 A1  Mar. 6, 2014

(30) Foreign Application Priority Data

Aug. 29, 2012 (CA) ...................................... 2787279

(51) Int. Cl.
- *B64C 37/00* (2006.01)
- *B60F 5/02* (2006.01)
- *B60B 1/00* (2006.01)

(52) U.S. Cl.
CPC .............. *B60F 5/02* (2013.01); *B64C 2201/162* (2013.01); *B64C 2201/126* (2013.01); *B64C 2201/027* (2013.01); *B60B 1/00* (2013.01); *B60Y 2200/80* (2013.01)
USPC ................................................ 244/2; 244/50

(58) Field of Classification Search
CPC ........ B64C 37/00; B64C 27/10; B64C 27/52; B64C 39/024; B64C 2201/00; B64C 2201/024; B64C 2201/088; B64C 2201/126; B64C 2201/162; B64C 2201/20; B64C 2201/208; B60F 5/02; B60F 5/003
USPC ................................ 244/2, 50, 56, 23 B, 12.4
See application file for complete search history.

(56) References Cited

U.S. PATENT DOCUMENTS

| | | | | |
|---|---|---|---|---|
| 769,721 | A | * | 9/1904 | Thompson ........................ 244/5 |
| 1,031,797 | A | * | 7/1912 | Janesone ........................... 244/9 |
| 1,777,941 | A | * | 10/1930 | Szakacs .......................... 244/50 |
| 3,147,936 | A | * | 9/1964 | Mercille .......................... 244/2 |
| 3,874,618 | A | * | 4/1975 | Bates .............................. 244/50 |
| 5,454,531 | A | * | 10/1995 | Melkuti ........................ 244/12.6 |
| 5,895,011 | A | * | 4/1999 | Gubin ........................... 244/12.1 |
| 6,144,180 | A | | 11/2000 | Chen et al. |
| 6,398,160 | B1 | * | 6/2002 | Hsia ............................. 244/35 R |
| 6,588,701 | B2 | | 7/2003 | Yavnai |
| 7,510,142 | B2 | | 3/2009 | Johnson |
| 7,959,104 | B2 | | 6/2011 | Kuntz |
| 8,205,820 | B2 | | 6/2012 | Goossen et al. |
| 8,794,564 | B2 | * | 8/2014 | Hutson ....................... 244/17.17 |
| 8,794,566 | B2 | * | 8/2014 | Hutson ....................... 244/17.23 |
| 2010/0181414 | A1 | * | 7/2010 | Lopez, Jr. ..................... 244/12.4 |
| 2011/0139923 | A1 | * | 6/2011 | Papanikolopoulos et al. .... 244/2 |

* cited by examiner

*Primary Examiner* — Joseph W Sanderson
*Assistant Examiner* — Jessica Wong
(74) *Attorney, Agent, or Firm* — Nixon & Vanderhye P.C.

(57) ABSTRACT

A combination rotor and wheel assembly for an unmanned vehicle with ground and aerial mobility has a rotor arm adapted to be attached at an inner end thereof to a vehicle body. A rotor is rotatably connected to an outer end of the rotor arm about a rotor axis, and a rotor drive mounted on the rotor arm rotates the rotor such that the rotor exerts an upward lift force on the rotor arm. An open spoked wheel is rotatably connected about the rotor axis independent of the rotor The diameter of the wheel is greater than that of the rotor, and a bottom edge of the wheel is below the rotor. A wheel drive rotates the wheel. Vehicles can have various numbers and orientations of the rotor and wheel assembly to provide aerial and ground mobility.

24 Claims, 8 Drawing Sheets

VEHICLE WITH AERIAL AND GROUND MOBILITY

This invention is in the field of unmanned vehicles (UMV) and in particular a UMV that has both the capabilities of an unmanned aerial vehicle (UAV) and of an unmanned ground vehicle (UGV), and thus can both fly and roll along the ground.

BACKGROUND

Remote controlled unmanned vehicles are well known for use in military and police surveillance, bomb disposal, disaster investigation, and the like. Most commonly these UMVs are unmanned ground vehicles (UGV) which have the ability to travel only along the ground, or unmanned aerial vehicles (UAV) which have the ability to travel only in the air.

Aerial vehicles, commonly electric battery powered hovering vehicles with spinning rotors for lift and propulsion, have the ability to access elevated areas like windows and roof tops and provide a wide range of observation, but have a limited operating time due to the high energy requirements of flight and the weight of batteries. Such an aerial vehicle is disclosed for example in U.S. Pat. No. 7,510,142 to Johnson.

Ground vehicles have a much longer operating time but have difficulties accessing elevated areas, and maneuvering over stairs and like obstacles. Such a ground vehicle is disclosed for example in U.S. Pat. No. 6,144,180 to Chen et al.

Due to the limitations of such a single travel mode, UMVs have been developed which have the capability to travel both in the air and along the ground. For example U.S. Pat. No. 8,205,820 to Goossen et al. discloses an aerodynamic flying assembly comprising an unmanned aerial vehicle integrated with an unmanned ground vehicle A power unit and controls are shared by the unmanned aerial vehicle and the unmanned ground vehicle, and a disengagement mechanism separates the unmanned ground vehicle from the unmanned aerial vehicle for ground operations.

U.S. Pat. No. 6,588,701 to Yavnai discloses a remotely-controlled unmanned mobile device that is operable in either of two modes. The device has a rotor assembly that allows it to vertically take off and land, to fly to a selected site and then hover. The device walks on legs that extend from the device for a ground mode of operation, and retract for a flying mode of operation.

U.S. Pat. No. 7,959,104 to Kuntz discloses a combination UAV/UGV comprising a vehicle body with front and rear rotors mounted on each side of the body about corresponding rotational axes. Each rotor has an annular covering attached to the tips of the rotor blades such that the covering essentially forms a wheel with the rotor blades acting as the spokes. The rotors are movable from a flying mode, where the rotational axes are oriented vertically such that the rotating rotors provide lift, to a ground mode where the rotational axes are oriented horizontally and the body is supported on the annular covering, and the rotating rotors act as wheels to move the body along the ground.

A problem with the Kuntz vehicle is that in ground mode, the wheel treads will often pick up debris which unbalances the rotor/wheel assembly and which can make the vehicle unable to fly. Also the annular covering increases the mass that must be rotated for flight. Further since the annular covering spins with the rotors, any contact with walls or the like during flight can damage the rotor. Even slight contact can slow the rotor such that control is difficult, and can also upset the balance of the rotor and adversely affect flying.

SUMMARY OF THE INVENTION

It is an object of the present invention to provide an unmanned vehicle apparatus that overcomes problems in the prior art.

In a first embodiment the present invention provides a combination rotor and wheel assembly for an unmanned vehicle with ground and aerial mobility. The assembly comprises a rotor arm adapted to be attached at an inner end thereof to a vehicle body. A rotor is rotatably connected to an outer end of the rotor arm about a rotor axis, and a rotor drive mounted on the rotor arm is operative to rotate the rotor such that the rotor exerts an upward lift force on the rotor arm. An open spoked wheel is rotatably connected to the outer end of the rotor arm about the rotor axis independent of the rotor A diameter of the wheel is greater than a diameter of the rotor, and a bottom edge of the wheel is below the rotor. A wheel drive is mounted on the arm and is operative to rotate the wheel.

In a second embodiment the present invention provides an unmanned vehicle apparatus comprising a vehicle body, and right and left rotor arms extending from corresponding right and left sides of the vehicle body. A rotor is rotatably connected to an outer end of each rotor arm about a rotor axis, and a rotor drive is operative to rotate each rotor such that each rotor exerts an upward lift force on the corresponding rotor arm. A corresponding open spoked wheel is rotatably connected to the outer end of each rotor arm about the rotor axis independent of the rotor. A diameter of the wheel is greater than a diameter of the corresponding rotor, and a bottom edge of the wheel is below the rotor, and a wheel drive is operative to rotate the wheels. The right and left rotor arms are oriented such that the bottom edges of the wheels support the vehicle body for movement along the ground, and such that the lift force generated by rotating the rotors is operative to raise the vehicle body and wheels above the ground.

The rotor arms of the rotor and wheel assemblies can be pivotally attached to the body of the vehicle so that the rotational axes of the rotors can be moved to a more upright orientation, typically near vertical, so that substantially all of the lift force exerted by the spinning rotors is directed upward to provide lift for the vehicle. Remote controls operate the wheel drives independently for ground steering and propulsion, operate the rotor drives to provide aerial steering and propulsion, and also pivot the arms with respect to the body to convert the vehicle from a flying to a ground position. Cameras will typically be mounted on the body to allow for control and observation.

During flight the wheel is stationary while the rotor spins inside the wheel, such that any debris picked up by the wheels does not affect the balance of the rotor. The mass that is rotated at high speed for flying mode is also much reduced compared to the prior art, reducing power requirements. The stationary wheel also serves to protect the rotor from contact with building walls or like objects during flight.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
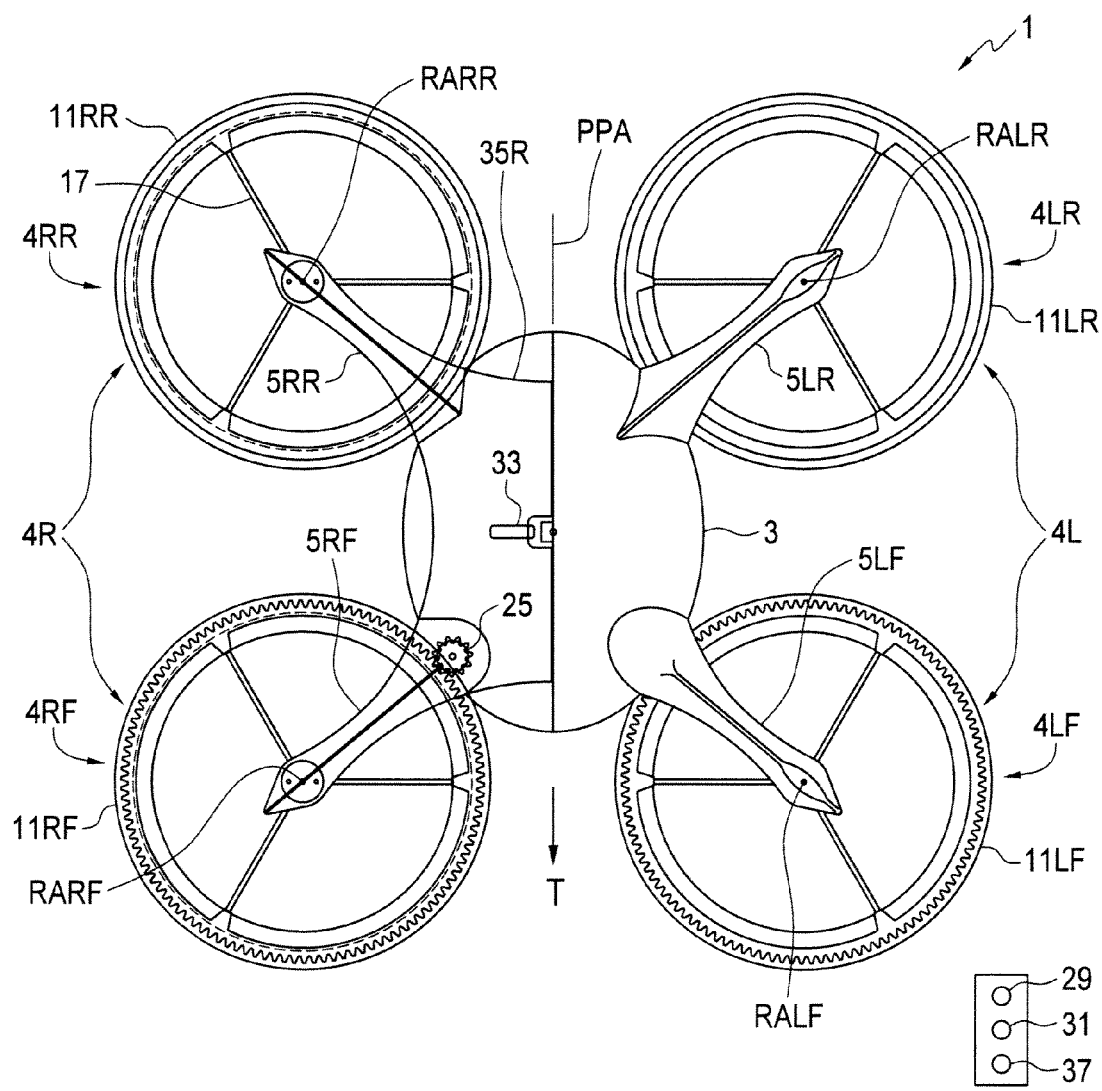
FIG. 1 is a schematic top view of an embodiment of an unmanned vehicle apparatus of the present invention shown in a flying position.
Figure 2:
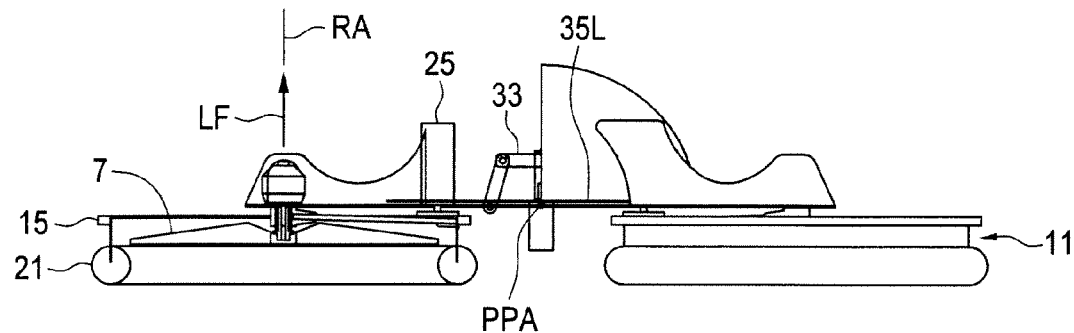
FIG. 2 is a schematic front view of the embodiment of FIG. 1 shown in the flying position.
Figure 3:
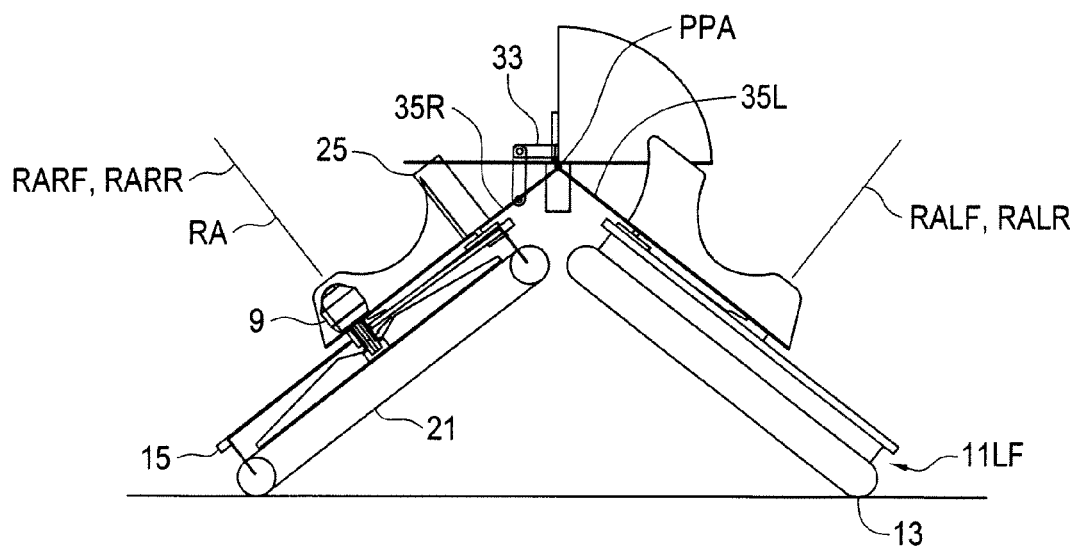
FIG. 3 is a schematic front view of the embodiment of FIG. 1 shown in the ground position.

FIGS. 1-3 schematically illustrate an embodiment of an unmanned vehicle apparatus 1 of the present invention. The apparatus 1 comprises a vehicle body 3 and right and left rotor and wheel assemblies 4R, 4L extending from corresponding right and left sides of the vehicle body 3.

Figure 4:
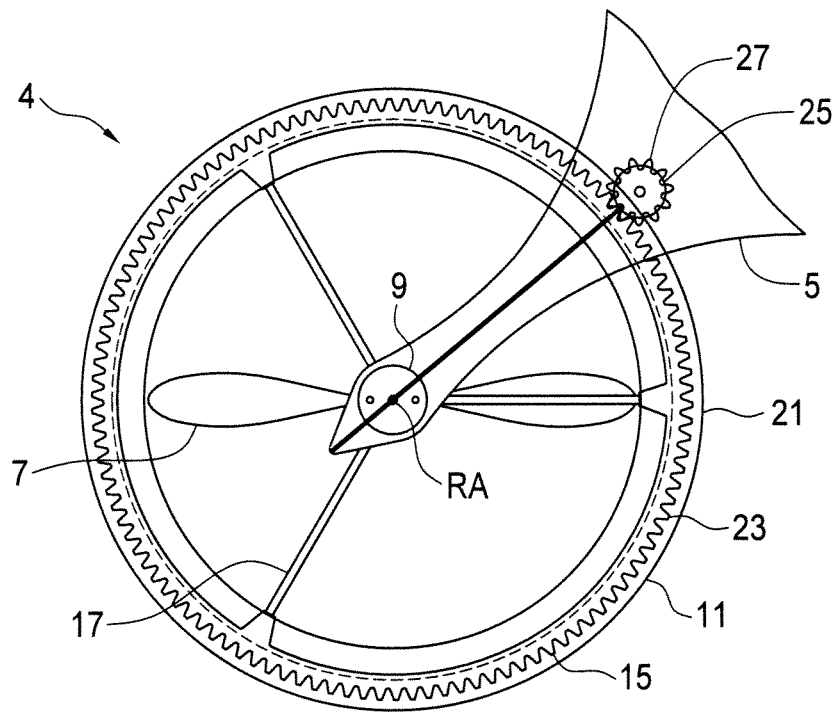
FIG. 4 is a schematic top view of an embodiment of a rotor and wheel assembly of the present invention, as installed on the embodiment of the vehicle apparatus of FIG. 1.
Figure 5:
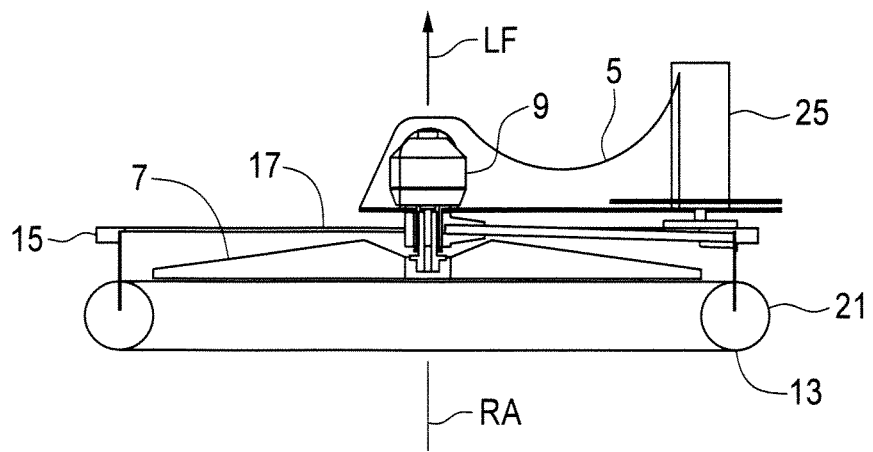
FIG. 5 is a schematic front view of the embodiment of the rotor and wheel assembly of FIG. 4.

Each rotor and wheel assembly 4, as schematically illustrated in FIGS. 4 and 5, comprises a rotor arm 5 adapted to be attached at an inner end thereof to the vehicle body 3, and a rotor 7 rotatably connected to an outer end of the rotor arm 5 about a rotor axis RA, and a rotor drive is mounted on the rotor arm operative to rotate the rotor 7 such that the rotor exerts an upward lift force LF on the rotor arm 5 in the direction of the rotational axis RA. In the illustrated apparatus 1 the rotor drive is provided by a rotor motor 9 mounted on the rotor arm 5 and connected directly to the rotor 7. An open spoked wheel 11 is rotatably connected to the outer end of the rotor arm 5 about the rotor axis RA independent of the rotor 7. The diameter of the wheel 11 is greater than the diameter of the rotor 7, and a bottom edge 13 of the wheel 11 is below the rotor 7. Thus the rotor 7 rotates inside the wheel 11, and above the bottom of the wheel 11 such that the rotor blades are protected from contact with walls or the like when flying. The open spoked structure of the wheel 11 allows air to flow freely to the rotor 7 to provide lift when flying. A wheel drive is mounted on the arm and operative to rotate the wheel 11.

In the illustrated assembly 4, the wheel 11 comprises an annular rim 15 connected by spokes 17 to a hub 19 that is rotatably attached to the end of the arm 5, and an annular tread member 21 is connected to the rim 15 below the rim and concentric with the rim such that the bottom edge 13 of the wheel is provided by the tread member 21.

Also in the illustrated assembly 4, the rims 15 on front wheels 11RF, 11LF on the front rotor and wheel assemblies 4RF, 4LF define gear teeth 23 and the wheel drive is provided by a wheel motor 25 mounted on each corresponding front rotor arm 5RF, 5LF with a sprocket 27 mounted on the motor shaft that is operative to engage the gear teeth 23 to rotate the front wheels 11RF, 11LF.

The rotor 7 thus rotates in a protected plane just below the rim 15 and above the tread member 21. The diameter of the rotor 7 is about the same as the inside diameter of the tread member 21.

It is contemplated that the combination rotor and wheel assembly 4 can be used in various ways to provide an unmanned vehicle with ground and aerial mobility, for example a vehicle with only two rotor and wheel assemblies, one on the right and one on the left side of the body, could conceivably operate satisfactorily. Such alternative embodiments are discussed below.

The illustrated apparatus 1 however, for increased stability, has four rotor and wheel assemblies 4 illustrated as front and rear right rotor and wheel assemblies 4RF, 4RR and front and rear left rotor and wheel assemblies 4LF, 4LR. To provide ground steering and propulsion in the illustrated four wheeled apparatus 1, the right wheel 11RF on the right side and the left wheel 11LF on the left side are driven at variable speeds independently of each other.

The right and left front and rear rotor and wheel assemblies 4RF, 4RR, 4LF, 4LR are oriented such that the bottom edges 13 of the wheels 11 support the vehicle body 3 for movement along the ground, and such that rotating or spinning the rotors 7 provides a lift force operative to raise the vehicle body 3 and attached rotor and wheel assemblies 4 above the ground. In the illustrated apparatus 1 a remote rotor control 29 is operative to independently vary the rotational speed of the rotor motors 9 to provide flight control, and a remote wheel control 31 is operative to independently vary the rotational speed of the wheel motors 25 to provide ground propulsion and steering control.

Also, as seen in the top view of FIG. 1, only the front right and front left rotor and wheel assemblies 4RF, 4LF are equipped with a wheel motor 25 while the rear right and left rotor and wheel assemblies 4RR, 4LR are simply allowed to roll freely, thus providing a two wheel drive ground vehicle.

Figure 6:
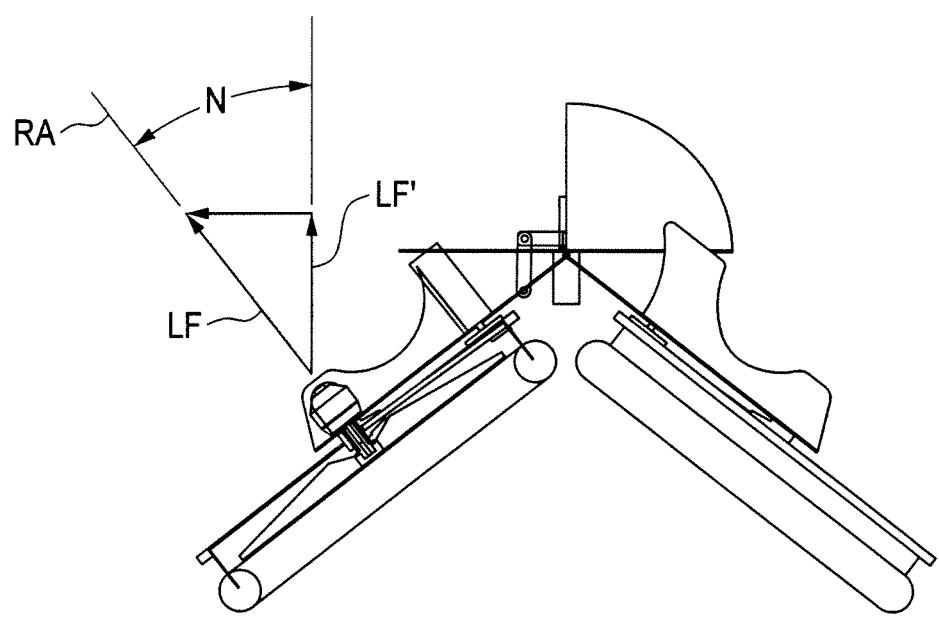
FIG. 6 is a schematic front view of the embodiment of FIG. 1 shown in the ground position, and illustrating the orientation and relative magnitudes of the force components exerted by the spinning rotor.
Figure 7A:
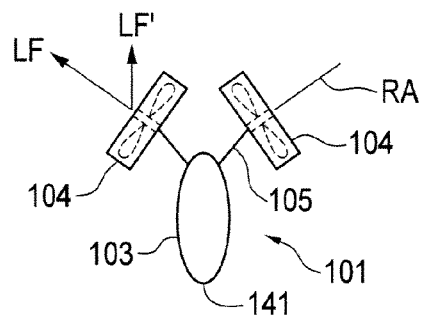
FIGS. 7A and 7B respectively show front and top views of an alternate fixed arm two rotor/wheel embodiment of an unmanned vehicle apparatus of the present invention shown in the flying position.
Figure 7B:
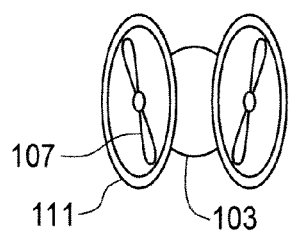
Figure 7C:
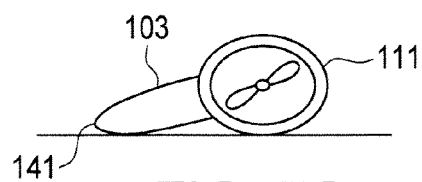
FIGS. 7C and 7D respectively show side and top views of the fixed two rotor/wheel embodiment of FIGS. 7A, 7B shown in the ground position.
Figure 7D:
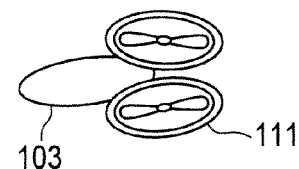
Figure 8A:
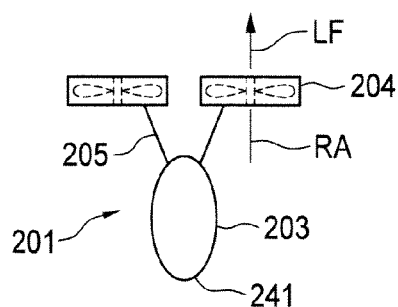
FIGS. 8A and 8B respectively show respectively show front and top views of an alternate pivoting arm two rotor/wheel embodiment of an unmanned vehicle apparatus of the present invention shown in the flying position.
Figure 8B:
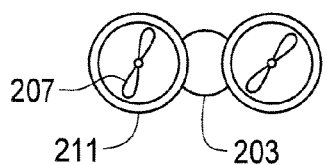
Figure 8C:
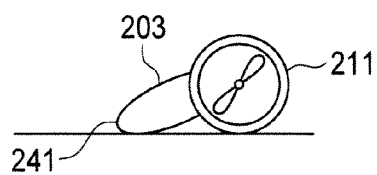
FIGS. 8C and 8D respectively show side and top views of the pivoting arm two rotor/wheel embodiment of FIGS. 8A, 8B shown in the ground position.
Figure 8D:
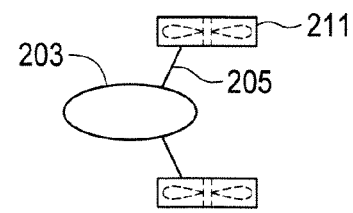
Figure 9A:
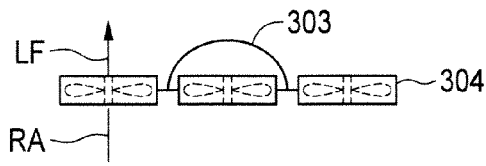
FIGS. 9A and 9B respectively show respectively show front and top views of an alternate pivoting arm three rotor/wheel embodiment of an unmanned vehicle apparatus of the present invention shown in the flying position.
Figure 9C:
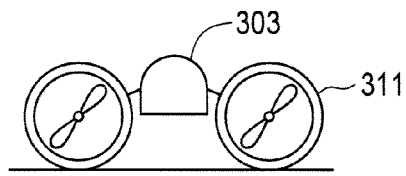
FIGS. 9C and 9D respectively show side and top views of the pivoting arm three rotor/wheel embodiment of FIGS. 9A, 9B shown in the ground position.
Figure 9B:
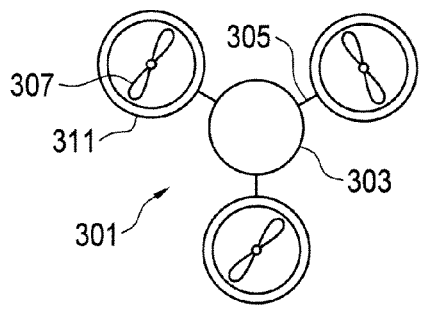
Figure 9D:
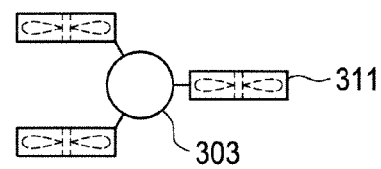
Figure 10A:
FIGS. 10A and 10B respectively show respectively show front and top views of an alternate pivoting arm six rotor/wheel embodiment of an unmanned vehicle apparatus of the present invention shown in the flying position.
Figure 10C:
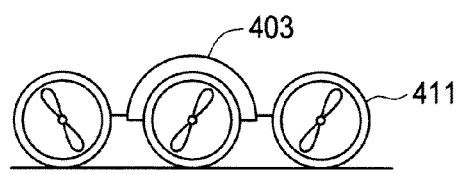
FIGS. 10C and 10D respectively show side and top views of the pivoting arm six rotor/wheel embodiment of FIGS. 10A, 10B shown in the ground position.
Figure 10B:
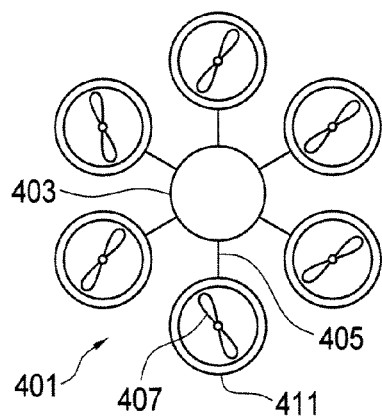
Figure 10D:
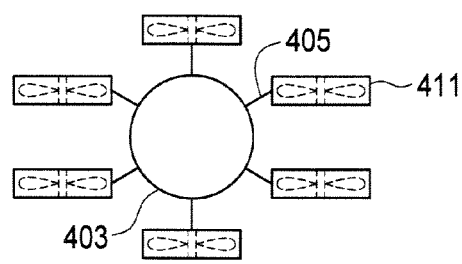

FIGS. 3 and 6 schematically illustrate a front view of the apparatus 1 showing the bottom edges of the wheels 13 resting on the ground, and the rotor axes RA tilted at an angle N of about 40 degrees down from vertical. Operating the wheel motors 25 will move the apparatus 1 along the ground, and varying the speed of the wheel 11 on one side relative to that on the other side provides steering control.

As illustrated in FIG. 6, spinning the rotors 7 when in this orientation will create an upward lift force LF in the direction of the tilted rotor axis RA, and result in an actual upward lift component of LF' which is only about 77% of the force LF generated by the rotor 7. It is contemplated that the rotor and wheel assemblies 4 could be fixed at some similar angle where the upward lift component of LF' is sufficient to lift the apparatus 1 off the ground, and the wheels 11 are oriented suitably for movement along the ground. Such an arrangement would be fairly simple to make, however a significant proportion of the lift force LF generated by the rotors 7 will be wasted.

To avoid this waste of energy, in the illustrated apparatus 1 the arms 5 of each of the rotor and wheel assemblies 4 are pivotally mounted to the body 3, and an arm actuator 33 is operative to pivot the arms 5 of the rotor and wheel assemblies 4 from the flying position shown in FIG. 2, where the rotor axes RA are in an upright orientation, to the ground position shown in FIG. 3 where the rotor axes RA are in a lateral orientation.

Figure 14A:
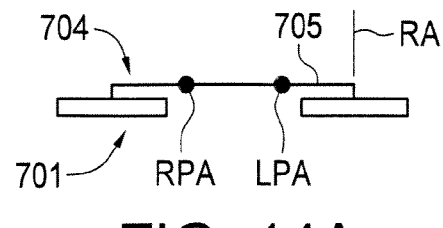
FIGS. 14A-14C schematically illustrate front views of another alternate embodiment of an unmanned vehicle apparatus of the present invention shown in the flying, ground, and stored positions.
Figure 14B:
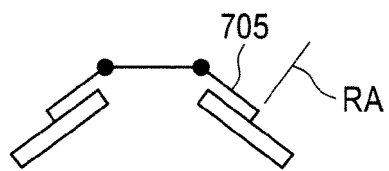

It is contemplated that when in the flying position the rotor axes RA will be oriented within about 10 degrees of vertical. With an angle of 10 degrees, the actual upward lift component of LF' will be about 98% of the force LF generated by the rotor 7, significantly increasing the lift capabilities compared to an angle of 40 degrees. When in the ground position, the rotational axes RA could be tilted down to 90 degrees from vertical, such that the rotational axes RA are horizontal and the wheels are oriented vertically as in a conventional vehicle. FIGS. 13C and 14C described below show such an orientation which is convenient for storage and portability of the apparatus 1. It is contemplated however that such an orientation is not required for satisfactory ground operations, and that the mechanism of the arm actuator 33 can be simplified by reducing the downward tilt to between about 30 degrees and about 50 degrees downward from vertical when in the ground position, and still be satisfactory. The wider stance between the contact points of the wheels and ground on right and left sides when the arms are oriented between about 30 degrees and about 50 degrees also increases the stability of the apparatus in the ground position.

To further simplify the mechanism of the arm actuator 33 the front and rear right rotor arms 5RF, 5RR are mounted to a right arm plate 35R and oriented such that front and rear right rotor axes RARF, RARR are substantially parallel, corresponding front and rear right wheels 11RF, 11RR are aligned and oriented to roll in a ground operating travel direction T, and the right arm plate 35R is pivotally attached to a lower portion of the vehicle body 3 about a plate pivot axis PPA oriented substantially in alignment with the ground operating travel direction T.

Similarly the front and rear left rotor arms 5LF, 5LR are mounted to a left arm plate 35L and oriented such that front and rear left rotor axes RALF, RALR are substantially parallel, corresponding front and rear left wheels 11LF, 11LR are aligned and oriented to roll in the ground operating travel direction T, and the left arm plate 35L is pivotally attached to the vehicle body 3 about the same plate pivot axis PPA. In the illustrated apparatus 1, the right and left plate pivot axes PPA for the corresponding right and left arm plates 35R, 35L coincide, however it is contemplated that they could be separated by a distance, as shown for example in FIG. 14A described below.

In the illustrated apparatus 1, the arm actuator 33 is operative to pivot both the right and left arm plates 35R, 35L simultaneously from the flying position shown in FIG. 2 where the rotor axes RA are in an upright orientation, to the ground position shown in FIG. 3 where the rotor axes RA are in a lateral orientation. The arms 5 are thus controlled simply by a single mechanism, again operated by a remote arm control 37.

Further embodiments of an unmanned vehicle apparatus of the present invention are schematically illustrated in FIGS. 7A-10D. FIGS. 7A-7D schematically illustrate a vehicle apparatus 101 with two fixed rotor and wheel assemblies 104, with arms 105 fixed to right and left sides of the body 103. In the flying position illustrated in FIGS. 7A (front) and 7B (top), the spinning rotors 107 create a lift force LF and the lateral orientation of the rotational axes RA results in an actual upward lift component LF' which will be calculated to be sufficient to lift the apparatus 101 such that the tail end 141 of the body 103 hangs down. In the ground position illustrated in FIGS. 7C (side) and 7D (top), the wheels 111 are oriented for ground travel and the tail end 141 drags on the ground on a skid surface, or a small wheel could be provided as well depending on the application.

FIGS. 8A-8D schematically illustrate a vehicle apparatus 201 with two pivoting rotor and wheel assemblies 204, with arms 205 pivotally attached to right and left sides of the body 203. In the flying position illustrated in FIGS. 8A (front) and 8B (top), the spinning rotors 207 create a lift force LF and the rotational axes RA are oriented substantially vertically so that all the lift force LF exerts an upward force to lift the apparatus 201 into the air with the tail end 241 of the body 203 hanging down. In the ground position illustrated in FIGS. 8C (side) and 8D (top), the wheels 211 are pivoted to an orientation for ground travel and the tail end 241 again drags on the ground.

FIGS. 9A-9D schematically illustrate a vehicle apparatus 301 with three pivoting rotor and wheel assemblies 304, with arms 305 pivotally attached to the body 303 and substantially equally spaced around the body 303. In the flying position illustrated in FIGS. 9A (front) and 9B (top), the spinning rotors 307 create a lift force LF and the rotational axes RA are oriented substantially vertically so that all the lift force LF exerts an upward force to lift the apparatus 301 into the air. In the ground position illustrated in FIGS. 9C (side) and 9D (top), the wheels 311 are pivoted to an orientation for ground travel.

FIGS. 10A-10D schematically illustrate a vehicle apparatus 401 with six pivoting rotor and wheel assemblies 404, with arms 405 pivotally attached to the body 403 and substantially equally spaced around the body 403. In the flying position illustrated in FIGS. 10A (front) and 10B (top), the spinning rotors 407 create a lift force LF and the rotational axes RA are oriented substantially vertically so that all the lift force LF exerts an upward force to lift the apparatus 401 into the air. In the ground position illustrated in FIGS. 10C (side) and 10D (top), the wheels 411 are pivoted to an orientation for ground travel.

Wheels on the right and left sides would be rotated at variable speeds independently of each other to provide directional steering control for ground travel. Other numbers and orientations of rotor and wheel assemblies are contemplated and as well, additional fixed conventional rotors could be attached to the body where increased lift was desired.

The rotor and wheel assemblies are attached in selected numbers and orientations to suit the particular application being pursued, either fixed or pivotally, to a vehicle body to provide vehicles, such as the unmanned vehicle apparatuses 1, 101, 201, 301, 401 described above, that have both aerial and ground mobility.

Figure 11:
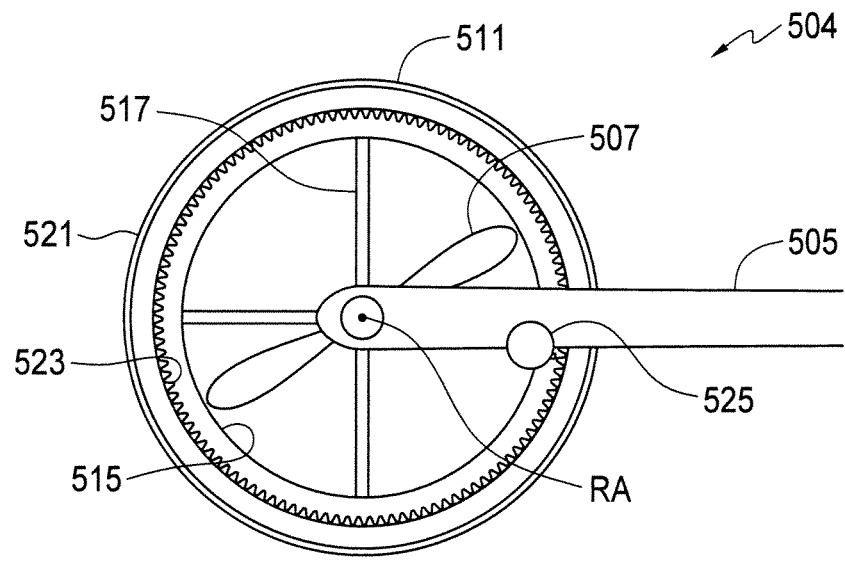
FIG. 11 is a schematic top view of an alternate embodiment of a rotor and wheel assembly of the present invention.
Figure 12:
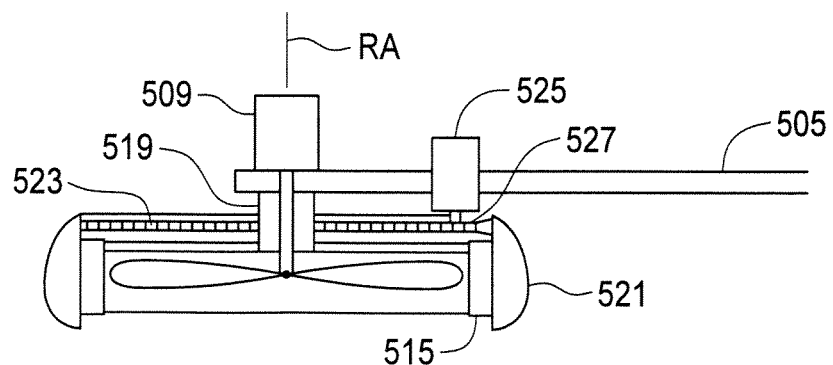
FIG. 12 is a schematic front view of the embodiment of the rotor and wheel assembly of FIG. 11.

It is contemplated that various other wheel mechanisms could be used as well. For example FIGS. 11 and 12 schematically illustrate an alternate embodiment of a rotor and wheel assembly 504 of the present invention. In the rotor and wheel assembly 504 the wheel 511 comprises an annular fixed rim 515 connected by spokes 517 to a hub 519 that is fixed to the arm 505 at the rotor axis RA, instead of being rotatably attached at the rotor axis as in the rotor and wheel assembly 4 described above. Instead, an annular tread member 521 is rotatable on the outer surface of the fixed rim 515 and only the tread member rotates about the rotor axis. The bottom edge of the wheel 511 is provided by the tread member 521.

The rotor drive is provided by a rotor motor 509 mounted on the rotor arm 505 and connected directly to the rotor 507 which rotates inside the wheel 511, and above the bottom of the wheel 111 such that the rotor blades are protected from contact with walls or the like when flying. The open spoked structure of the wheel 511 allows air to flow freely to the rotor 507 to provide lift when flying. The fixed rim 515 defines gear teeth 523 and the wheel drive is provided by a wheel motor 525 mounted on rotor arm 505 with a sprocket 527 mounted on the motor shaft that is operative to engage the gear teeth 523 to rotate the tread member 521 on the fixed rim 515.

Figure 13A:
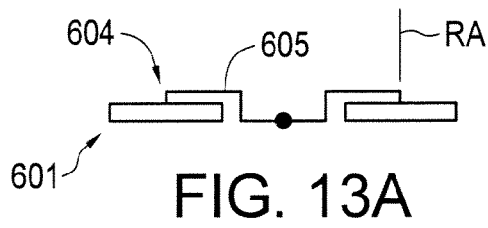
FIGS. 13A-13C schematically illustrate front views of an alternate embodiment of an unmanned vehicle apparatus of the present invention shown in the flying, ground, and stored positions.
Figure 13B:
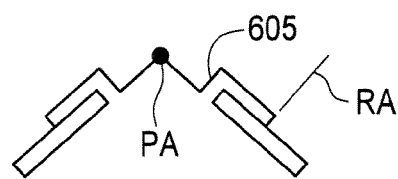
Figure 13C:
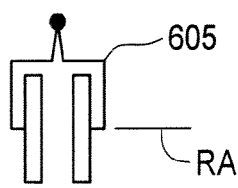
Figure 14C:
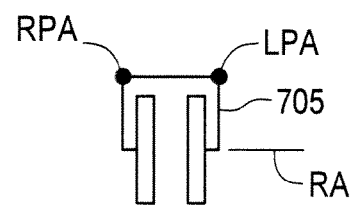

FIGS. 13A-13C schematically illustrate an alternate apparatus 601 that is movable to a stored position where the rotor arms 605 of the right and left rotor and wheel assemblies 604 are movable from the flying position of FIG. 13A to the ground position of FIG. 13B to a stored position shown in FIG. 13C where the rotor axes RA of the rotor and wheel assemblies 604 are oriented substantially horizontally.

In the apparatus 601 of FIGS. 13A-13C the right and left arms 605 pivot about a common pivot axis PA. FIGS. 14A-14C schematically illustrate a further alternate apparatus 701 that is movable to a stored position where the rotor arms 705 of the right and left rotor and wheel assemblies 704 pivot about separated pivot axes RPA, LPA and are again movable from the flying position of FIG. 14A to the ground position of FIG. 14B to the stored position shown in FIG. 14C where the rotor axes RA are oriented substantially horizontally.

While it may be possible to configure the same arm actuator that moves the arms from the flying position to the ground position to also move the arms to the stored position, it may be simpler to simply provide some manual release to move the arms to the stored position, since this need only be done when the apparatus is stationary. It may also be desired in some applications to configure an unmanned vehicle to operate on the ground while the rotor axes are in the horizontal stored position.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An unmanned vehicle apparatus comprising: a vehicle body; right and left rotor and wheel assemblies attached to and extending from corresponding right and left sides of the vehicle body, each rotor and wheel assembly comprising: a rotor arm adapted to be attached at an inner end thereof the vehicle body; a rotor rotatably connected to an outer end of the rotor arm about a rotor axis, and a rotor drive mounted on the rotor arm operative to rotate the rotor such that the rotor exerts an upward lift force on the rotor arm; an open spoked wheel rotatably connected to the outer end of the rotor arm about the rotor axis independent of the rotor, wherein a diameter of the wheel is greater than a diameter of the rotor, and wherein a bottom edge of the wheel is below the rotor; a wheel drive mounted on the arm and operative to rotate the wheel independently of the rotor; wherein the right and left rotor and wheel assemblies are oriented such that the bottom edges of the wheels support the vehicle body for movement along a ground surface, and such that the upward lift force generated by rotating the rotors is operative to raise the vehicle body and wheels above the ground.

2. The apparatus of claim 1 wherein the rotor arms of the right and left rotor and wheel assemblies are pivotally mounted to the body about substantially horizontal arm pivot axes, and comprising an arm actuator operative to tilt the right and left rotor arms such that the rotor axis moves from a flying position, where the rotor axes are in an upright orientation, outward and downward toward a laterally oriented ground position.

3. The apparatus of claim 2 wherein the rotor axes are oriented within about 10 degrees of vertical when in the flying position.

4. The apparatus of claim 3 wherein the rotor axes are oriented between about 30 degrees and about 50 degrees downward from vertical when in the ground position.

5. The apparatus of claim 2 wherein the rotor arms of the right and left rotor and wheel assemblies are movable to a stored position wherein the rotor axes thereof are oriented substantially horizontally.

6. The apparatus of claim 1 comprising front and rear right and left rotor and wheel assemblies mounted to the vehicle body.

7. The apparatus of claim 6 wherein the front and rear right rotor and wheel assemblies are mounted to a right arm plate and oriented such that front and rear right rotor axes are substantially parallel, corresponding front and rear right wheels are aligned and oriented to roll in a ground operating travel direction, and wherein the right arm plate is pivotally attached to a lower portion of the vehicle body about a plate pivot axis oriented substantially in alignment with the ground operating travel direction.

8. The apparatus of claim 7 wherein the front and rear left rotor and wheel assemblies are mounted to a left arm plate and oriented such that front and rear left rotor axes are substantially parallel, corresponding front and rear left wheels are aligned and oriented to roll in the ground operating travel direction, and wherein the left arm plate is pivotally attached to the vehicle body about the plate pivot axis.

9. The apparatus of claim 8 comprising an arm actuator operative to tilt the right and left arm plates such that the rotor axes move from a flying position, where the rotor axes are in an upright orientation, outward and downward toward a laterally oriented ground position.

10. An unmanned vehicle apparatus comprising: a vehicle body right and left rotor arms extending from corresponding right and left sides of the vehicle body; a rotor rotatably connected to an outer end of each rotor arm about a rotor axis, and a rotor drive operative to rotate each rotor such that each rotor exerts an upward lift force on the corresponding rotor arm; a corresponding open spoked wheel rotatably connected to the outer end of each rotor arm about the rotor axis independent of the rotor, wherein a diameter of the wheel is greater than a diameter of the corresponding rotor, and wherein a bottom edge of the wheel is below the rotor; a wheel drive operative to rotate each wheel independently of the corresponding rotor; wherein the right and left rotor arms are oriented such that the bottom edges of the wheels support the vehicle body for movement along a ground surface, and such that the lift force generated by rotating the rotors is operative to raise the vehicle body and wheels above the ground.

11. The apparatus of claim 10 wherein the right and left rotor arms are pivotally mounted to the body about a substantially horizontal arm pivot axis, and comprising an arm actuator operative to pivot the right and left rotor arms from a flying position where the rotor axes are in an upright orientation, to a ground position where the rotor axes are in a lateral orientation.

12. The apparatus of claim 11 wherein the rotor axes are oriented within about 10 degrees of vertical when in the flying position.

13. The apparatus of claim 12 wherein the rotor axes are oriented between about 30 degrees and about 50 degrees downward from vertical when in the ground position.

14. The apparatus of claim 10 wherein at least one rotor drive comprises a rotor motor mounted on the corresponding rotor arm and connected to the corresponding rotor and comprising a rotor control operative to vary a rotational speed of the rotor motor.

15. The apparatus of claim 10 wherein at least one wheel comprises an annular rim connected by spokes to a hub, and an annular tread member connected to the rim below the rim and concentric with the rim such that the bottom edge of the at least one wheel is provided by the tread member.

16. The apparatus of claim 15 wherein the rim defines gear teeth and wherein the wheel drive operative to drive the at least one wheel comprises a wheel motor mounted on the rotor arm and operative to engage the gear teeth to rotate the at least one wheel.

17. The apparatus of claim 10 comprising front and rear right and left rotor arms mounted to the vehicle body, with corresponding front and rear right and left rotors and wheels mounted thereon about corresponding rotor axes, and wherein the wheel drive is operative to rotate at least one right wheel and at least one left wheel.

18. The apparatus of claim 17 wherein the front and rear right rotor arms are mounted to a right arm plate and oriented such that front and rear right rotor axes are substantially parallel, corresponding front and rear right wheels are aligned and oriented to roll in a ground operating travel direction, and wherein the right arm plate is pivotally attached to a lower portion of the vehicle body about a right plate pivot axis oriented substantially in alignment with the ground operating travel direction.

19. The apparatus of claim 18 wherein the front and rear left rotor arms are mounted to a left arm plate and oriented such that front and rear left rotor axes are substantially parallel, corresponding front and rear left wheels are aligned and oriented to roll in the ground operating travel direction, and wherein the left arm plate is pivotally attached to the vehicle body about a left plate pivot axis oriented substantially in alignment with the ground operating travel direction.

20. The apparatus of claim 19 comprising an arm actuator operative to pivot the right and left arm plates from a flying position where the rotor axes are in an upright orientation, to a ground position where the rotor axes are in a lateral orientation.

21. The apparatus of claim 20 wherein the rotor axes are oriented within about 10 degrees of vertical when in the flying position, and the rotor axes are oriented between about 30 degrees and about 50 degrees downward from vertical when in the ground position.

22. The apparatus of claim 21 wherein the wheel drive comprises a right wheel drive operative to rotate one of the front and rear right wheels and a left wheel drive operative to rotate one of the front and rear left wheels, and a wheel drive control operative to independently vary a drive speed of the right and left wheel drives.

23. The apparatus of claim 19 wherein the right and left plate pivot axes coincide.

24. The apparatus of claim 19 wherein the right and left arm plates are movable to a stored position where all the rotor axes are oriented substantially horizontally.

\* \* \* \* \*